April 16, 1963 J. H. SONEKI 3,086,148
PORTABLE DEMAGNETIZER
Filed Feb. 3, 1959

INVENTOR
Joseph H. Soneki

BY Natt M Emery Jr.
ATTORNEY

United States Patent Office 3,086,148
Patented Apr. 16, 1963

3,086,148
PORTABLE DEMAGNETIZER
Joseph H. Soneki, Bethlehem, Pa., assignor to Bethlehem Steel Company, a corporation of Pennsylvania
Filed Feb. 3, 1959, Ser. No. 790,951
9 Claims. (Cl. 317—157.5)

This invention relates to the demagnetization of magnetic bodies and more particularly to a portable electronic device for demagnetizing steels which have been inadvertently magnetized during their process of manufacture or shipment.

It is the object of this invention to provide a small, compact, variable frequency demagnetizing unit.

It is a further object to provide a portable demagnetizer whereby the degree of magnetization present in the object to be demagnetized need not be measured prior to the demagnetization process.

An additional object is to provide a unit which operates on standard 60 cycle alternating current, converting this frequency to that optimum which is most efficient in demagnetizing the particular steel subjected to the treatment.

The present invention broadly comprises a source of pulses and a bifilar wound coil, the combination of which accomplishes the objectives specified heretofore. The pulse source comprises a power supply, multivibrator, cathode follower decouplers and thyratron amplifiers. The connections of the pulse source and the bifilar wound coil are such that the pulses can be fed alternately in first one direction and then the opposite direction through the coil, thus in effect producing an alternating current which consists of symmetrical positive and negative waves, substantially square and 180° out of phase with each other. These positive and negative surges of current in turn produce symmetrical positive and negative fluxes by means of the bifilar method of winding, and magnetic bodies which are either passed through the coil or around which the coil is passed are demagnetized in the following manner.

While the body to be demagnetized is within the confines of the coil, the alternatively positive and negative flux created by the above-mentioned surges of current magnetizes the body in first the positive and then the negative direction at constant peak magnitude. As the body moves beyond the confines of the coil, the amplitude of the flux passing through the body diminishes gradually, due to the relatively high reluctance of air. Ultimately the body is beyond the influence of the alternating flux, and demagnetization is effectively accomplished.

Figure 1:
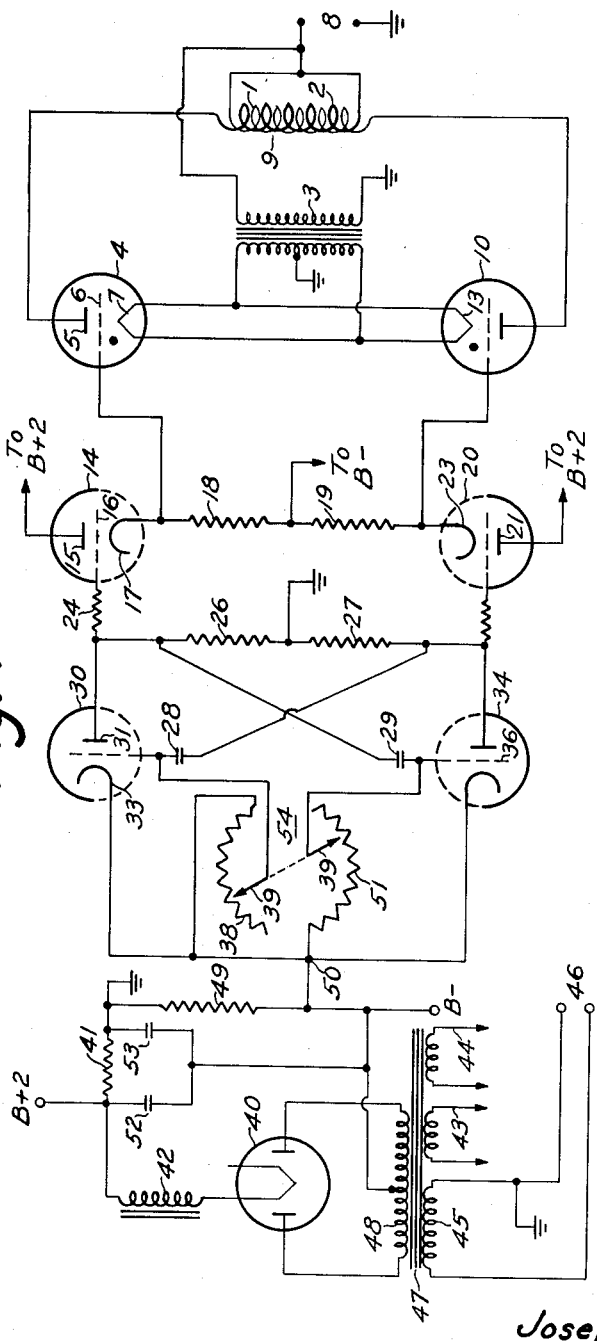

The invention will be better understood from the following detailed description and accompanying drawings, in which, FIG. 1 is a circuit diagram illustrating the preferred circuit arrangement.

Figure 2:
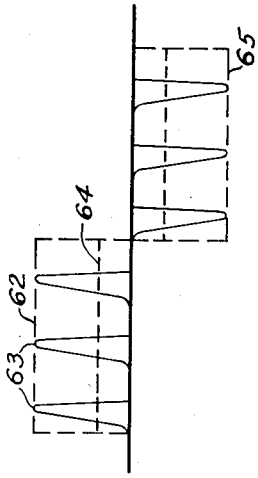

FIG. 2 is a graph illustrating the waveform of the current fed into the bifilar wound coil.

In FIG. 1, an alternating current source 46, comprising a conventional power supply, for example 110 volts and 60 cycles, is electrically connected to the low voltage side 45 of transformer 47. Coupled to this transformer are coils 43 and 44, which supply voltage to the filaments of triodes 14, 20, 30 and 34. A tap from the high voltage side 48 supplies B— voltage for the subsequent stages. The dual plates of the full wave rectifier 40 are electrically connected to the terminals of the high voltage side of the transformer, and a substantially direct current is produced. This current is further smoothed out by means of filter circuits comprising resistor 41 and dual capacitors 52 and 53, and coil 42. The junction of resistor 41 and capacitor 52 provides a positive D.C. potential, designated here as B+2. Resistor 49 acts as a load for the rectifier circuit.

The direct current produced by the power supply divides at point 50 and passes to the cathode of either multivibrator tube 30 or 34, according to which tube is conducting, since only one tube may conduct at any one time due to the cross-coupling inherent in multivibrator circuits. If we assume tube 34 is conducting, the current goes from point 50 to the cathode of tube 34, and flows through the tube to the anode. The accompanying voltage drop at the anode of tube 34 produces a negative voltage on the grid of tube 20 sufficient to render tube 20 non-conductive. Since anode of tube 34 is cross-coupled by means of capacitor 28 to the grid of multivibrator tube 30, tube 30 is non-conductive until said capacitor completes its discharge across the resistor 38. Capacitors 28 and 29 and resistors 38 and 51, respectively, form RC time constants which can be varied by rotation of the dial 39 of the dual potentiometer. This time constant determines the conduction time of the multivibrator tubes, and thus the frequency at which the multivibrator circuit oscillates, which in this particular embodiment of the invention can be varied between ½ and 20 c.p.s. Resistors 26 and 27, the junction of which is gounded, supply the load impedance for the multivibrator circuit.

Continuing to assume that tube 34 is conducting, a square wave envelope 62 flows through grid limiting resistor 24 and appears at grid 16 of triode 14, which in combination with cathode resistor 18 forms a cathode follower circuit, the purpose of which is to decouple, or prevent feedback between, the aforementioned multivibrator and subsequent amplification stage. The anodes 15 and 21 are positively polarized by B+2, and the junction of cathode resistors 18 and 19 is connected to negative potential B—. The voltage at the cathode 17 of tube 14 appears at grid 6 of thyratron 4 and allows 60 cycle positive current pulses 63 from the signal input 8, which is a conventional power supply, to flow from the cathode 7 to the anode 5 of said thyratron, the number of pulses conducted during each half cycle of the square wave envelope being dependent upon the frequency of the multivibrator circuit. Negative half cycles of the 60 cycle signal are not present since, as is well known in the art, gas tubes such as thyratrons only conduct current during positive half cycles. The number of pulses conducted may be synchronized to exactly correspond to the envelope produced by the multivibrator, as in FIG. 2, in which the multivibrator circuit is oscillating at 20 c.p.s., but this is not necessary to the satisfactory operation of the circuit.

These pulses flow through coil 2 of the bifilar wound coil 9, where the average current 64 forms a substantially square wave, the frequency of which is predetermined by the multivibrator circuit.

The coil 9 is connected to the above-mentioned 60 cycle 110 volt signal source 8, which also furnishes transformer 3 power to heat filaments 7 and 13 of thyratrons 4 and 10, respectively.

During the second half cycle 65, multivibrator tube 30 conducts the voltage drop produced by the current flowing from the cathode 33 to the anode 31 placing a negative voltage on grid 36 of tube 34, triode 20 decouples of prevents feedback, thyratron 10 fires, and positive pulses of 60 cycle current flow through coil 1 of bifilar coil 9 in a direction such that the flux produced is opposite to that which had previously been produced by passage of current through coil 2.

Thus a plurality of 60 cycle positive current pulses is alternately fed through first one coil and then the other coil of bifilar coil 9. The alternating flux produced has equal positive and negative peaks due to the bifilar method of winding, in which two coils are wound simultaneously side by side so that both coils are equidistant from their common center line. The effect of this alternating flux on the body to be demagnetized diminishes as the body leaves the confines of the coil, due to the reluctance of the air; ultimately the flux no longer has any effect upon the body, and it can be considered demagnetized.

Although I have thus described my invention hereinabove in considerable detail, I do not wish to be limited narrowly to the exact and specific particulars disclosed, but I may also use such substitutes, modifications or equivalents as are included within the scope and spirit of the invention or pointed out in the appended claims.

I claim:

1. A coil comprising a first winding and a second winding extending longitudinally of the coil, said first and second windings being wound in the same direction, a source of current, a circuit including means connecting said source of current with one end of said first winding, a circuit including means connecting said source of current with the opposite end of said second winding, switching devices in said circuits for opening and closing said circuits, control means for alternately opening and closing said switching devices, so arranged that when one of said switches is closed the other is open.

2. A bifilar wound coil comprising a first winding and a second winding extending longitudinally of the coil, a source of current, a circuit including means connecting said source of current with one end of said first winding, a circuit including means connecting said source of current with the opposite end of said second winding, switching devices in said circuits for opening and closing said ciricuts, control means for alternately opening and closing said switching devices, so arranged that when one of said switches is closed the other is open.

3. A device for demagnetizing magnetic bodies comprising a source of current, a coil having first and second windings, each of said windings being wound in the same direction and having first and second ends, said first end of said first winding connected to the geometrically opposite end of said second winding and to said source of current, switching means comprising first and second switching devices, said first switching device connected to the second end of said first winding, said second switching device connected to the other end of said second winding, and control means connected to said switching devices for alternately opening and closing said switching devices, said switching means connected to said control means so that when one of said switching devices is closed and conducting, the other of said switching devices is open.

4. A device for demagnetizing magnetic bodies comprising a source of current, a bifilar wound coil having first and second windings, each of said windings having first and second ends, said first end of said first winding connected to the geometrically opposite end of said second winding and to said source of current, switching means comprising first and second switching devices, each of said devices having an emitting element, a conduction controlling element, and an output element, the output element of said first device connected to the second end of said first winding, the output element of said second device connected to the other end of said second winding, each emitting element being connected to a source of power, and control means for alternately energizing said conduction controlling elements.

5. A device for demagnetizing magnetic bodies comprising a source of alternating current, a bifilar wound coil having first and second windings, each of said windings having first and second ends, said first end of said first winding being connected to the geometrically opposite end of said second winding and to said source of alternating current, switching means comprising first and second gaseous discharge tubes, each of said tubes having a cathode, an anode, and a conduction controlling grid, the anode of said first tube being connected to the second end of said first winding, the anode of said second tube being connected to the other end of said second winding, each cathode being connected to a source of power, and means for alternately energizing the grids of said tubes.

6. A device for demagnetizing magnetic bodies comprising a source of alternating current, a bifilar wound coil having first and second windings, each of said windings having first and second ends, said first end of said first winding connected to the geometrically opposite end of said second winding and to said source of alternating current, switching means comprising first and second gaseous discharge tubes, each of said tubes having a cathode, an anode, and a conduction controlling grid, the anode of said first tube being conected to the second end of said first winding, the anode of said second tube being connected to the other end of said second winding, each cathode being connected to a source of power, generating means for producing a substantially square wave voltage, said generating means having first and second output terminals at points whereby the voltage at said second output terminal is substantially 180° out of phase with the voltage at said first output terminal, means for impressing the voltage at said first output terminal upon the grid of said first gaseous discharge tube, and means for impressing the voltage at said second output terminal upon the grid of said second gaseous discharge tube.

7. A device as recited in claim 6 in which said generating means comprises a multivibrator.

8. A coil comprising a first winding and a second winding extending longitudinally of the coil, a source of current, a circuit including means connecting said source of current with an end of said first winding, a circuit including means connecting said source of current to an end of said second winding, said first and second windings so wound and so connected in said circuits that current in said first winding causes a flux within the coil opposite in direction to that caused by current in said second winding, switching devices in said circuits for opening and closing said circuits, control means for alternately opening and closing said switching devices, so arranged that when one of said switches is closed the other is open.

9. A device as recited in claim 8, said control means including means for varying the frequency of switching.

References Cited in the file of this patent

UNITED STATES PATENTS

| | | |
|---|---|---|
| 2,390,051 | Barth | Dec. 4, 1945 |
| 2,871,417 | Connoy | Jan. 27, 1959 |
| 2,895,016 | Moore | July 14, 1959 |
| 2,946,932 | Littwin | July 26, 1960 |
| 2,943,258 | Shawhan | June 28, 1960 |